United States Patent [19]

Noguchi

[11] Patent Number: 5,062,579
[45] Date of Patent: Nov. 5, 1991

[54] REEL SHAFT IN MAGNETIC TAPE CASSETTE RECORDING AND/OR REPRODUCING

[75] Inventor: Yasuhiro Noguchi, Tokorozawa, Japan

[73] Assignee: Nakamichi Corporation, Tokyo, Japan

[21] Appl. No.: 640,511

[22] Filed: Jan. 10, 1991

Related U.S. Application Data

[63] Continuation of Ser. No. 432,929, Nov. 7, 1989, abandoned.

[30] Foreign Application Priority Data

Jul. 11, 1988 [JP] Japan ............... 63-145153[U]

[51] Int. Cl.⁵ ..................................... B65H 75/22
[52] U.S. Cl. ........................... 242/68.3; 242/68.1; 242/194
[58] Field of Search .............. 242/68.3, 68.1, 193, 242/194, 180, 68, 200

[56] References Cited

U.S. PATENT DOCUMENTS 4,747,556 5/1988 Tanaka et al. ............... 242/68.1
4,815,675 3/1989 Koizumi ..................... 242/194

FOREIGN PATENT DOCUMENTS 2100889 1/1971 Fed. Rep. of Germany ..... 242/68.3
4512 1/1978 Japan ........................... 242/68.1

Primary Examiner—David Trafton
Assistant Examiner—Joseph A. Rhoa
Attorney, Agent, or Firm—Dann, Dorfman, Herrell and Skillman

[57] ABSTRACT

A reel shaft is mounted in a recording and/or reproducing apparatus such as a DAT unit for rotating a reel hubs in a tape cassette loaded in a predetermined position in the apparatus to reel up a magnetic tape into the reel hubs. The reel shaft includes a plurality of vanes secured to the outer periphery of a rotating body and adapted to be in engagement with corresponding engaging members formed in the reel hub. The vanes define respectively ridges extending in alignment with a center line in width of the magnetic tape when the tape cassette is in a predetermined loaded position in the apparatus. The reel hub is rotated with the reel shaft through engagement between the vanes and the corresponding engaging members, which is effected at specific points located on the ridges of the respective vanes of the reel shaft. Through such engagement, the axis of the reel hub remains coincident with the axis of the reel shaft during rotation.

3 Claims, 7 Drawing Sheets

REEL SHAFT IN MAGNETIC TAPE CASSETTE RECORDING AND/OR REPRODUCING

This is a continuation of Ser. No. 07/432,929, filed Nov. 7, 1989, now abandoned.

BACKGROUND OF THE INVENTION

1. Field of the Invention

This invention relates to a reel shaft in a magnetic recording and/or reproducing apparatus for performing recording and/or reproducing operation with respect to a magnetic tape cassette installed therein.

2. Description of the Prior Art

A typical example of conventional reel shaft employed in a digital audio taperecorder (DAT) unit is illustrated in FIG. 5 through FIG. 9. A pair of cylindrical reel hubs 3, 3 (only one of which is shown in the drawings) are freely rotatably mounted on a casing 2 of a DAT cassette 1, around which a magnetic tape T is wound. The reel hub 3 is made hollow in the axial direction to provide a reel shaft inserting aperture 4. The aperture 4 is provided with a plurality of projections 5, equally spaced apart one another, which extend in parralel with the axis O of the reel hub 3. More particularly, as best seen in FIG. 6, each projection 5 includes a center walls 5a confronting the axis O and a pair of side walls 5b, 5b tapered by a predetermined angle with respect to the axis O. The projection 5 has thus a trapezoidal cross-section when taken along a plane perpendicular to the axis O.

The reel shaft 7 arranged on the DAT unit for winding up the magnetic tape T is driven by a drive shaft 8 rotatably supported on a stationary shaft 10 planted on a mount chassis 9. The drive shaft 8 has a regular hexagon in a cross-section taken along a plane perpendicular to its axis P. A disc 11 is secured to the bottom of the drive shaft 8 for transmitting rotation of a motor (not shown) therethrough to the drive shaft 8.

A reel hub driving member 12 has in main a lower cylindrical section 12b and an upper truncated conical portion 12a with its diameter being decreased toward the top. The reel hub driving member 12 is made hollow to provide an aperture 13 of a regular hexagonal cross-section for engagement with the drive shaft 8. The top of the driving member 12 is covered by a cap 14. A coil spring 15 is disposed between the disc 11 and the bottom of the driving member 12 to normally urge the latter toward the uppermost position. With such arrangement, the driving member 12 will be rotated together with the drive shaft 8 but relative displacement therebetween in the axial direction will be permitted against depression of the coil spring 15.

A plurality (or three in this example) of projections 16, equally spaced apart one another by 120° angle, are integrally formed or secured to the outer periphery of the reel hub driving member 12. Each projection 16 includes a pyramid-shaped top section 16a attached to the upper truncated conical section 12a of the driving member 12 and having faces tapered with respect to the axis P of the reel shaft 7 and a lower spure columnar section 16b attached to the lower cylindrical section 12b and extending in parallel with the axis P. The lower section 16b has a configuration corresponding to the projection 5 of the reel hub 3.

After the DAT cassette 1 has been loaded into a predetermined position in the DAT unit, the reel shaft 7 passes through an insertion hole 6 formed in the underside of the casing 2 to enter the aperture 4 of the reel hub 3. Thus, the projections 5 of the reel hub 3 is brought into engagement with the projections 16, as best seen in FIG. 7. Configuration of the upper sections 12a and 16a of the driving member 12 and the projections 16 respectively will ensure smooth insertion of the reel shaft 7 into the aperture 4. Since the projections 5 and 16 have substantially the identical configuration and extend in parallel with the axes O and P respectively, engaging faces 16b of the projections 16 will be in touch entirely with engaging faces $5b_1$ of projections 5 as far as these axes O and P coincide with each other. With such engagement, the reel shaft 7 is driven by the motor to rotate in a direction shown by the arrow A, which causes the reel hub 3 to rotate to thereby reel up the magnetic tape T into the reel hub 3.

It has been found that the above-described prior art mechanism is duly applicable to a DAT unit of horizontal type in which the axes O and P of the reel hub 3 and the reel shaft 7 respectively extend in a vertical direction. However, in another type DAT in which the axes O and P extend in a horizontal direction, it will practically be impossible to provide concentric relationship in position between the reel shaft 7 and the reel hub 3 due to gravity. More specifically, since the outer diameter defined by the projections 16 of the reel shaft 7 is somewhat smaller than the inner diameter of the aperture 4, because of its own weight and weight of the magnetic tape T, the reel hub 3 would tend to be lowered relative to the reel shaft 7, thereby producing an offset between the axes O and P in the DAT cassette loaded position, as shown in FIG. 9. Eccentric rotation of the reel hub 3 would result in wow/flatter of the magnetic tape T.

Suppose another case wherein the reel hub axis O extends in parralel with the reel shaft axis P. However, in such case, the engaging face $15b_1$ of the hub projection 5 is secured tapered with respect to the reel hub axis O, engaging face $16b_1$ of the shaft projection 16 does not contact with the engaging face $5b_1$ by means of each face. While rotating the reel shaft 7 under such tapered condition, there would appear increased distortion in the axial direction of the reel hub 3 in winding of the magnetic tape T. Much distorted winding of the magnetic tape T would tend to come into contact with the inner wall of the casing 2 of the DAT cassette 1, resulting in failure of exerting a predetermined tension to the magnetic tape T.

SUMMARY OF THE INVENTION

It is therefore an object of this invention to provide a novel reel shaft for a magnetic tape cassette recording and/or reproducing apparatus, capable of eliminating disadvantages and drawbacks of the prior arts.

Another object of this invention is to provide the reel shaft which is applicable to any type magnetic tape recording and/or reproducing apparatus.

According to an aspect of this invention there is provided a reel shaft for a magnetic tape cassette recording and/or reproducing apparatus, comprising a rotating body driven by a motor mounted in the apparatus; and a plurality of projections secured to an outer periphery of the rotating body for engagement with engaging members projecting inwardly from an inner wall of a reel hub in a tape cassette to thereby transmit rotation to the reel hub. The projections respectively provide specific points located in alignment with the center line of a magnetic tape reeled around the reel hubs in the tape cassette installed in the apparatus in a predetermined loaded position. At the specific points, the projections are adapted to come into contact with the corresponding engaging members of the reel hub during rotation thereof.

BRIEF DESCRIPTION OF THE DRAWINGS

Further objects and advantages of this invention can be fully understood from the following detailed description when read in conjunction with the accompanying drawings in which:

FIG. 2 (B) and FIG. 2 (C) are views as seen from the directions X and Y in FIG. 2 (A);

DETAILED DESCRIPTION OF THE EMBODIMENT

A reel shaft according to this invention to be applied to a DAT unit will now be described by way of a specific embodiment thereof with reference to FIG. 1 through FIG. 4. In these drawings, parts and elements of the reel shaft substantially identical to those in the prior art one shown in FIG. 5 through FIG. 9 will be accompanied by the same reference numbers and detailed description thereof is omitted for the sake of simplicity.

Figure 1:
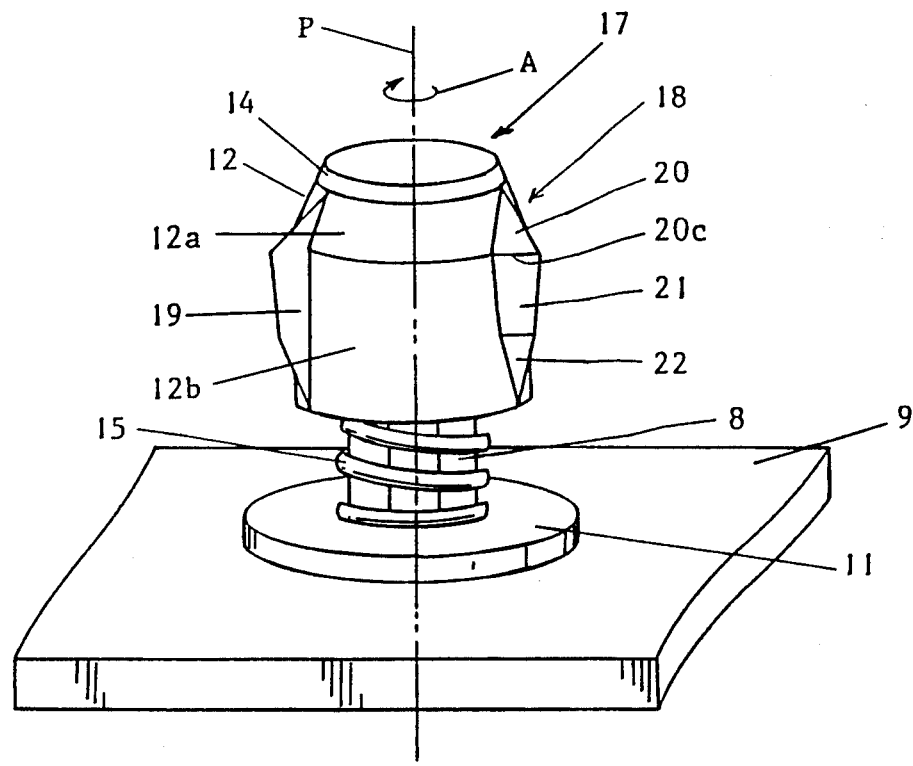
FIG. 1 is an oblique view showing a reel shaft embodying the invention.
Figure 2A:
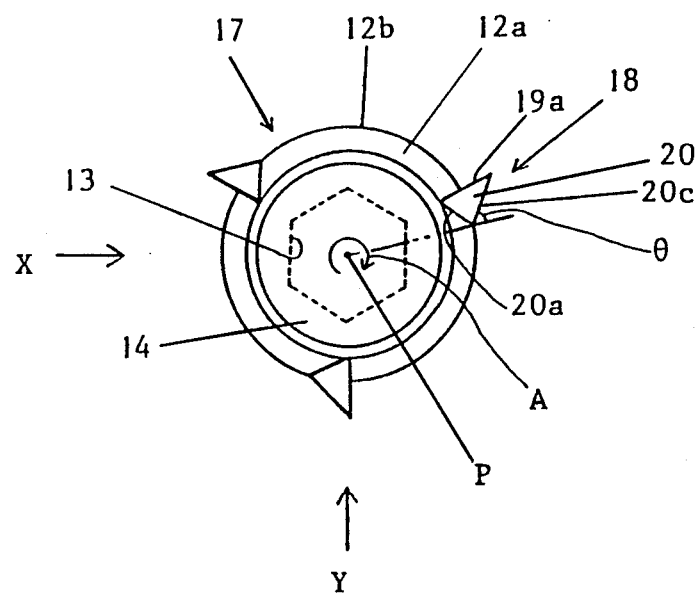
FIG. 2 (A) is a top view of the reel shaft.
Figure 2B:
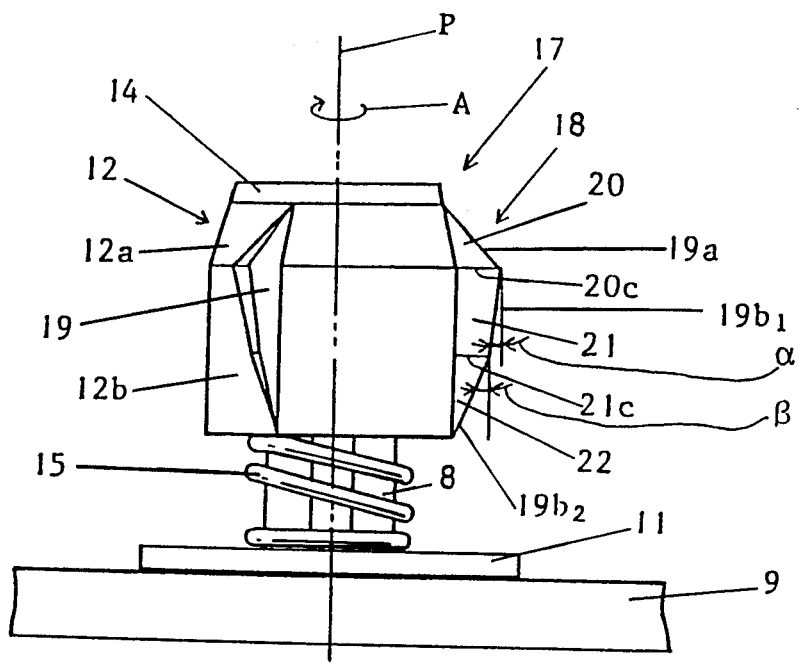
Figure 2C:
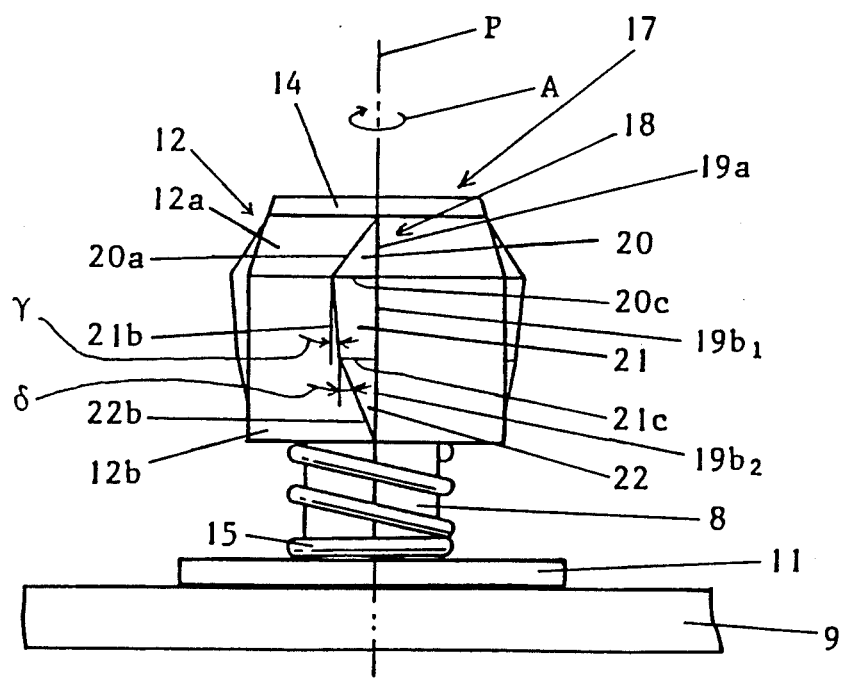
Figure 3:
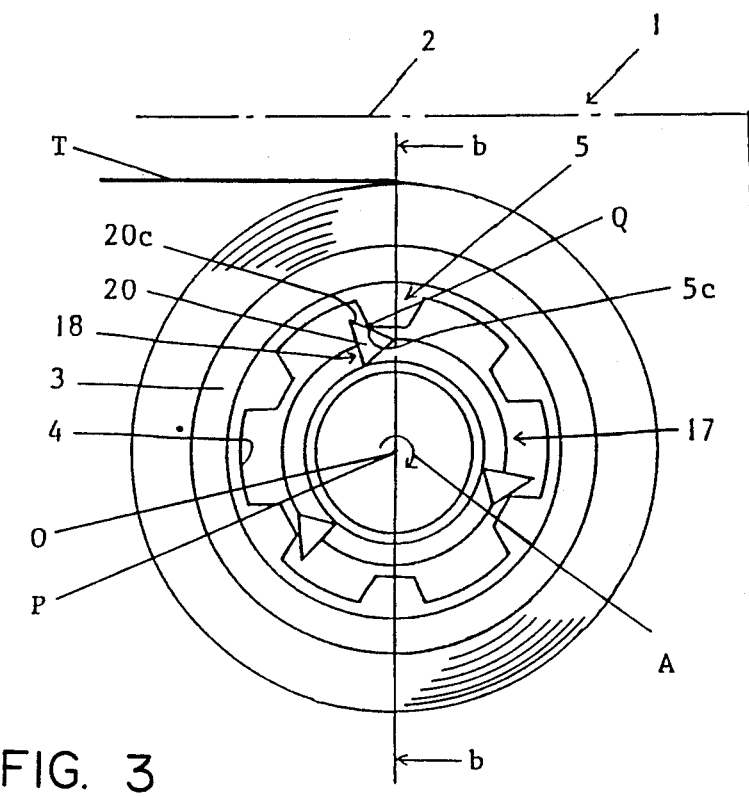
FIG. 3 is a plan view showing relationship between the reel shaft and a reel hub.
Figure 4:
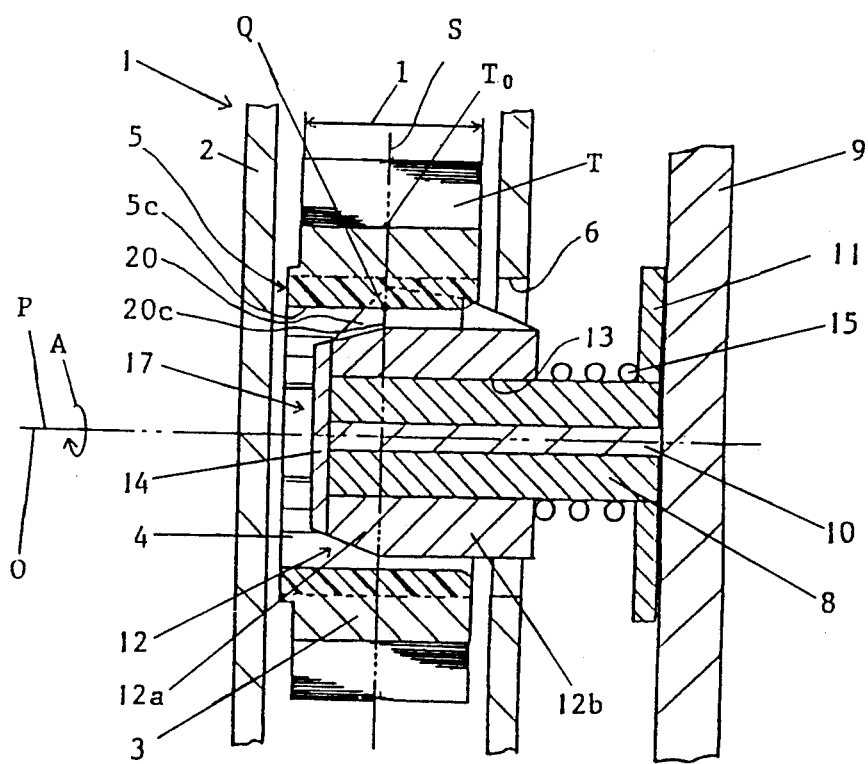
FIG. 4 is a sectional view taken along the line b—b in FIG. 3.
Figure 5:
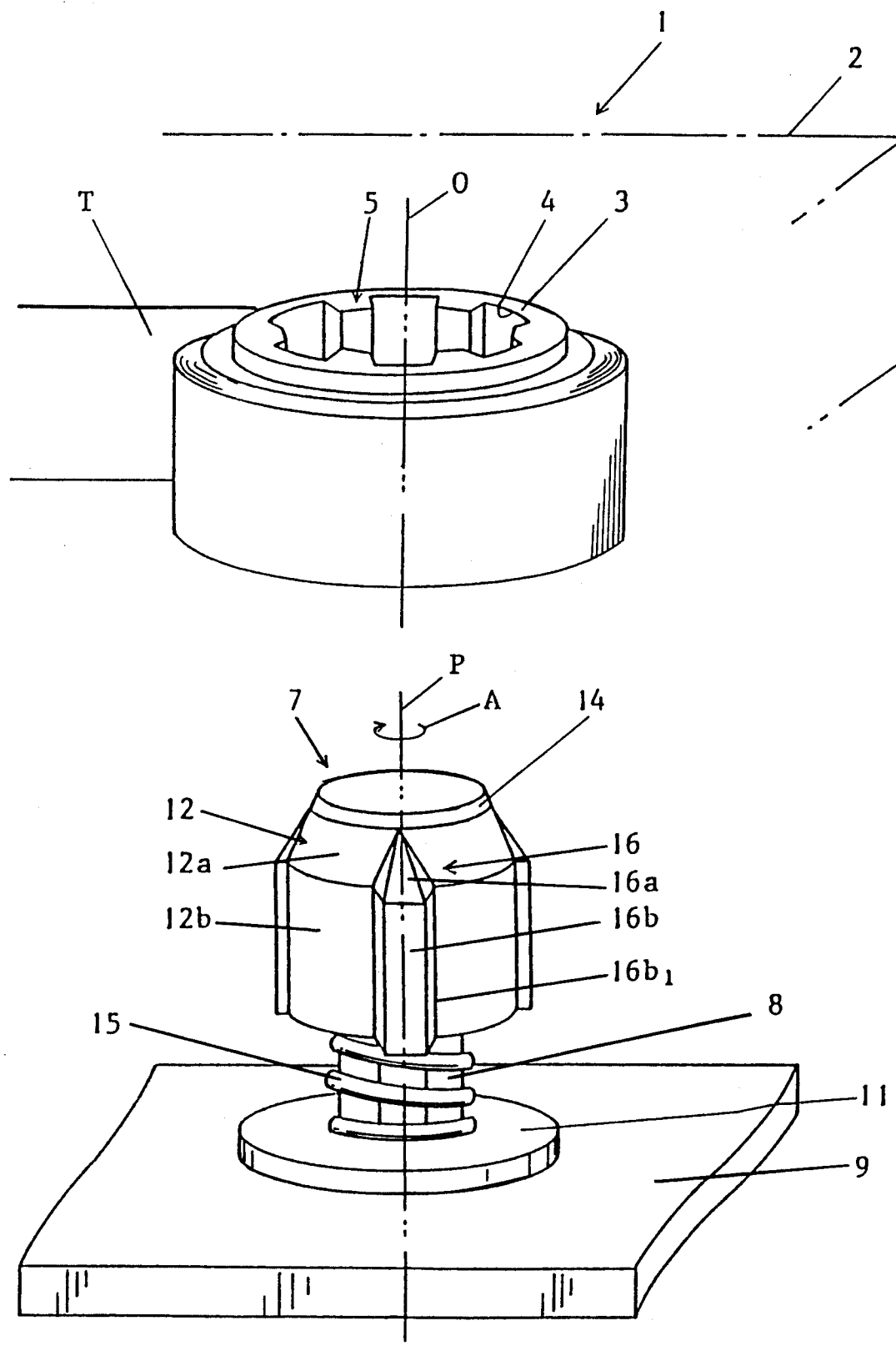
FIG. 5 is an oblique view showing the prior art reel shaft, as well as the reel hub.
Figure 6:
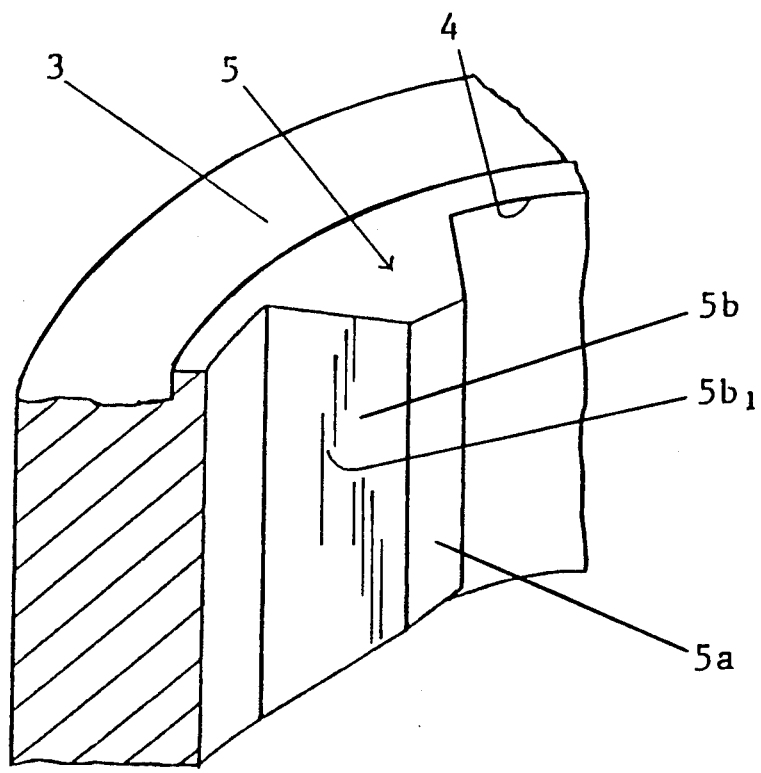
FIG. 6 is an oblique view, on an enlarged scale, showing a part of the reel hub.
Figure 7:
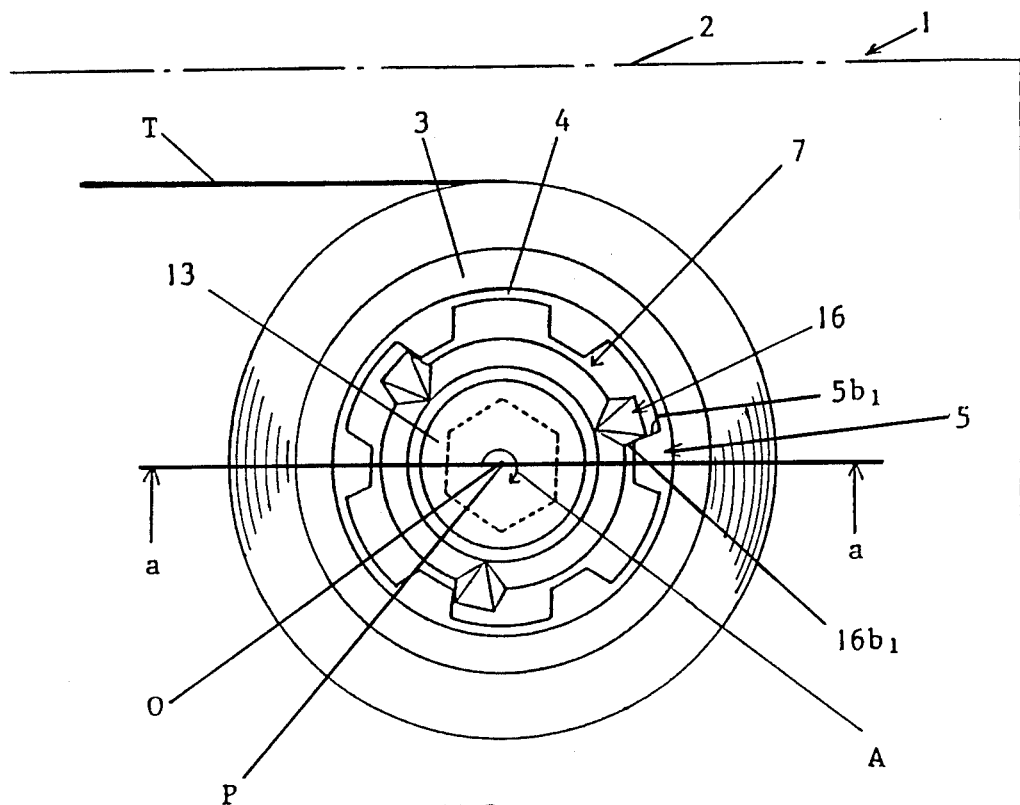
FIG. 7 is a plan view showing relationship between the prior art reel shaft and the reel hub in a case applied to a horizontal type DAT unit.
Figure 8:
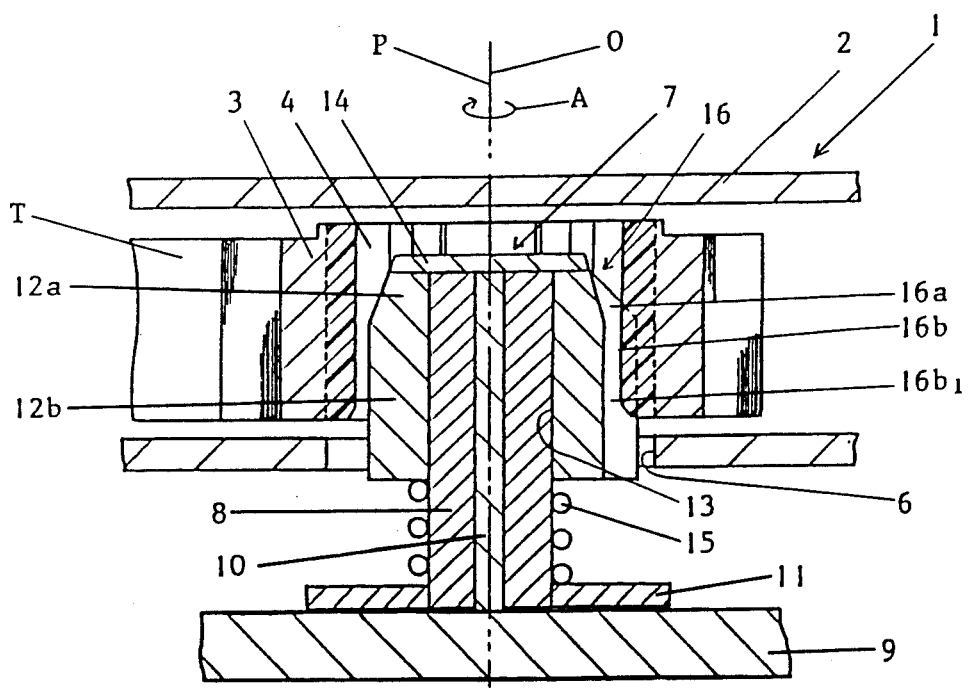
FIG. 8 is a sectional view taken along the line a—a in FIG. 7.
Figure 9:
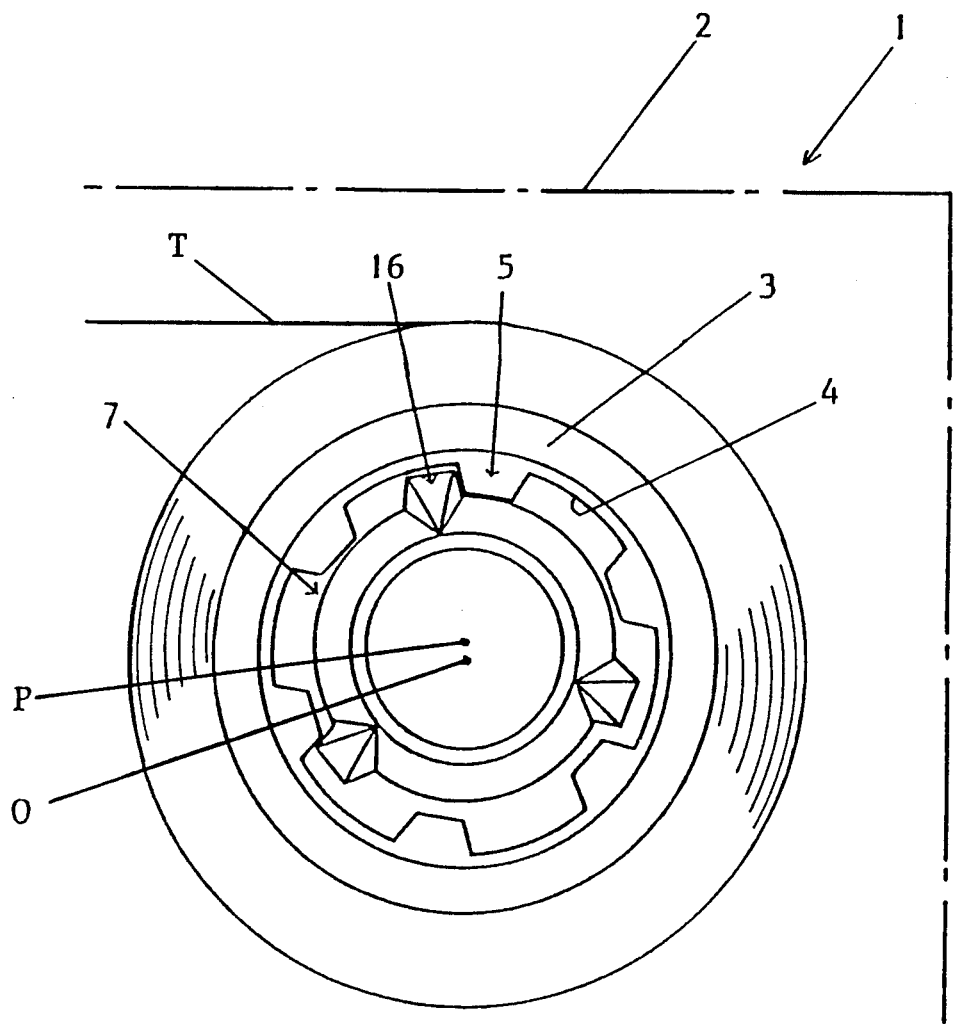
FIG. 9 is a plan view showing relationship between the prior art reel shaft and the reel hub in another case applied to a vertical type DAT unit.

The reel shaft 17 is arranged in a tape running mechanism at the reel-up side in a DAT unit of a vertical type. The reel shaft 17 includes a reel hub driving member 12, around which are secured three projections or vanes 18, equally spaced apart one another by 120° angle. The rear end wall of the vanes 18 in the direction of rotation of the reel shaft 17 as shown by the arrow A provide cliffs 19 projecting substantially radially from the outer periphery of the driving member 12. The cliffs 19 are defined by an upper ridge 19a positioned on an upper truncated conical section 12a of the driving member 12, and a middle ridge $19b_1$ and a lower ridge $19b_1$ both positioned on a lower cylindrical section 12b. As best seen in FIG. 2 (B), the highest apex from the outer periphery of the driving member 12 resides in a contact point between the upper ridge 19a and the middle ridge $19b_1$, which is positioned above a joint circle between the upper and lower sections 12a and 12b of the driving member 12. The middle ridge $19b_1$ and the lower ridge $19b_2$ extends in an oblique direction by angles $\alpha°$ and $\beta°$ ($\alpha<\beta<90°$), respectively, with respect to the axis P of the reel shaft 17.

On the fore side of the vanes 18 as viewed in the direction A, there are provided inclined three faces 20, 21 and 22, the first one located on the upper section 12a of the driving member 12 and the latter two on the lower section 12b. A ridge 20a of the first inclined face 20 is located on the upper section 12a and extends in an oblique direction with respect to the axis P in such a manner that it advances toward the direction A as it goes down. Another ridge 20c of the first inclined face 20 extends obliquely by a predetermined angle $\theta$ with respect to the radius of the reel shaft 17 toward a direction opposite to the direction A. The ridges 20c will be aligned with a center line $T_0$ in width of the magnetic tape T when the DAT cassette is loaded in the predetermined loaded position in the DAT unit. The first inclined face 20 is shaped into a triangle by these ridges 20a and 20c and the aforementioned ridge 19a.

The second inclined face 21 borders on the first inclined face 20 with the ridge 20c and also the vertical face 19 with the ridge $19b_1$. Another ridge 21b residing on the periphery of the lower cylindrical section 12b extends in an oblique direction by an angle $\gamma$ with respect to the axis P in such a manner that it directs rearward in the direction A as it goes down. The lower ridge 21c of the second inclined face 21 extends outwardly from the lower end of the ridge 21b to reach an apex formed between the second and third ridges $19b_1$ and $19b_2$ of the vertical face 19.

The third inclined face 22 borders on the second inclined face 21 with the ridge 21c and also on the vertical face 19 with the ridge $19b_2$. Another ridge 22b connecting between the lower end of the ridge 21b and the lower end of the ridge $19b_2$ on the periphery of the lower cylindrical section 12b extends in an oblique direction by an angle $\delta$ ($\gamma<\delta<90°$) with respect to the axis P so that it directs rearward in the direction A as it goes down.

The reel shaft 17 having the aforementioned construction will operate as follows.

In synchronism with loading operation of the DAT cassette into the predetermined position in the DAT unit, the reel shaft 17 enter the engaging aperture 4 of the reel hub 3 so that the projection 5 is guided by the first inclined face 20 to come into engagement with the reel hub driving member 18. In this engagement between the reel hub driving member 18 and the projection 5, the ridge 20c formed between the first and second inclined faces 20 and 21 will be in contact at a specific point Q with the ridge 5c of the projection 5. Accordingly, when the reel shaft 17 is driven by the motor, not shown in the drawings, to rotate in the direction A, the reel hub axis O will become in agreement with the reel shaft axis P to achieve automatic centering between the reel hub 3 and the reel shaft 17. During rotation of the reel shaft 17, the above-described engagement will remain enchanged. Since position of the ridge 20c in the reel hub driving member 18 is determined such that it will be in alignment with the center line $T_0$ in width of the magnetic tape T travelling in the prescribed normal path around the reel hub 3, the specific contact point Q will also be located on a plane S defined by the center line $T_0$. Therefore, even when the reel shaft 17 is employed in the vertical type DAT unit, there will be no tendency that the automatic centering between the reel hub 3 and the reel shaft 17 would be jeopardized due to the weight of the magnetic tape T as in the conventional reel shaft.

A degree of pressure to be applied to the projection 5 of the reel hub 3 during rotation of the reel shaft 17 for effecting the automatic centering is determined by the angle $\theta$ between the ridge 20c and the radius of the reel shaft 17. The centering capacity can thus be adjusted by modifying the angle $\theta$.

Rotation of the reel shaft 17 is transmitted to the reel hub 3 only through the point contact therebetween at the specific point Q, which will therefore describe an exact trace just on the plane S without vibration. There will be no distortion in the magnetic tape T reeled up into the reel hub 3.

Although the invention has been described in conjunction with a specific embodiment thereof, it is to be understood that many variations and modifications may be made without departing from spirit and scope of the invention as defined in the appended claims. For example, the second and third inclined faces 21 and 22 of the reel hub driving member 18 may be integrated into one face. The ridges $19b_1$ and $19b_2$ may be formed as one ridge extending straight between the lower end of the ridge 19a and the lower pointed end of the vane 18.

What is claimed is:

1. A reel shaft for a magnetic tape recording and/or reproducing apparatus, which comprises a rotating body; and a plurality of vanes secured to an outer periphery of said rotating body for engagement with axially extending engaging members of substantially rectangular cross-sectional profile projecting inwardly from an inner wall of a reel hub around which a magnetic tape is wound in a tape cassette, said vanes each having a ridge on the side of the vane which comes into contact only at a single point with an engaging member of the reel hub while said rotating body is rotating, said ridge being formed on the contacting side of the vane by the intersection of converging surfaces on the vane such that the ridge thus defined lies in a plane generally perpendicular to the axis of rotation so that all ridges lie in the plane which coincides with the center line of the width of the magnetic tape in the tape cassette loaded into the apparatus and such that each ridge is directed at an oblique angle to a radius of the rotating body and between said radius and a tangential position so that the vane will make contact only at a single point with an engaging member of the reel hub.

2. A reel shaft for a magnetic tape recording and/or reproducing apparatus, which comprises a shaft driven by a motor mounted in the apparatus to rotate in a predetermined direction; a cap secured to a leading end of said shaft; a reel driving member adapted to rotate together with said shaft, including a lower cylindrical portion and an upper truncated conical portion; spring means for urging said reel driving member toward said cap; and a plurality of spaced vanes secured to an outer periphery of said driving member and extending rearwardly from the direction of rotation for engagement with axially extending engaging members of substantially rectangular cross-sectional profile projecting inwardly from an inner wall of a reel hub around which a magnetic tape is wound in a tape cassette, to thereby transmit rotation of said shaft to the reel hub, said vanes each including a lower portion and an upper portion located respectively on said lower cylindrical portion and said upper truncated conical portion of said reel driving member, each portion having a surface on the side of the vane which comes into contact with an engaging member of the hub, which surfaces converge to provide a ridge therebetween in a common plane including the center line of the width of the magnetic tape in the tape cassette loaded into the apparatus, and such that each ridge is directed to an oblique angle to a radius of the rotating body and between said radius and a tangential position so that the vane will make contact only at a single point with an engaging member of the reel hub.

3. A reel shaft for a magnetic tape recording and/or reproducing apparatus, which comprises a rotating body; and a plurality of vanes secured to an outer periphery of said rotating body for engagement with axially extending engaging members of substantially rectangular cross-sectional profile projecting inwardly from an inner wall of a reel hub around which a magnetic tape is wound in a tape cassette, said vanes each including first and second tapered surfaces on the side of the vane which comes into contact only at a single point with an engaging member of the reel hub while said rotating body is rotating in a predetermined direction, said first and second tapered surfaces being directed rearward from the predetermined direction of rotation of said rotating member, said first and second surfaces being converged to define as an intersection therebetween a ridge positioned to lie in the plane of the center line of the width of the magnetic tape in the tape cassette when loaded into the apparatus, such that said ridge is directed at an oblique angle to a radius of the rotating body and between said radius and a tangential position so that the vane will make contact only at a single point between a point lying on the ridge and the engaging member of the reel hub while the rotating member is rotating in the predetermined direction.

* * * * *

UNITED STATES PATENT AND TRADEMARK OFFICE
CERTIFICATE OF CORRECTION

PATENT NO. : 5,062,579

DATED : November 5, 1991

INVENTOR(S) : Yasuhiro Noguchi

It is certified that error appears in the above-identified patent and that said Letters Patent is hereby corrected as shown below:

In the Title, after "REPRODUCING" insert --APPARATUS--.

Column 2, line 36, "$15b_1$" should be --$5b_1$--.

Signed and Sealed this

Ninth Day of March, 1993

Attest:

STEPHEN G. KUNIN

*Attesting Officer*     *Acting Commissioner of Patents and Trademarks*